Oct. 14, 1969

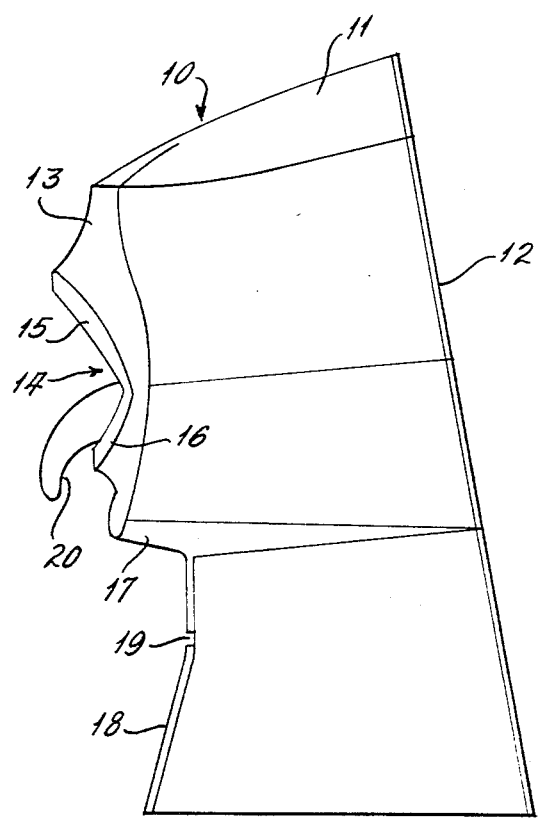
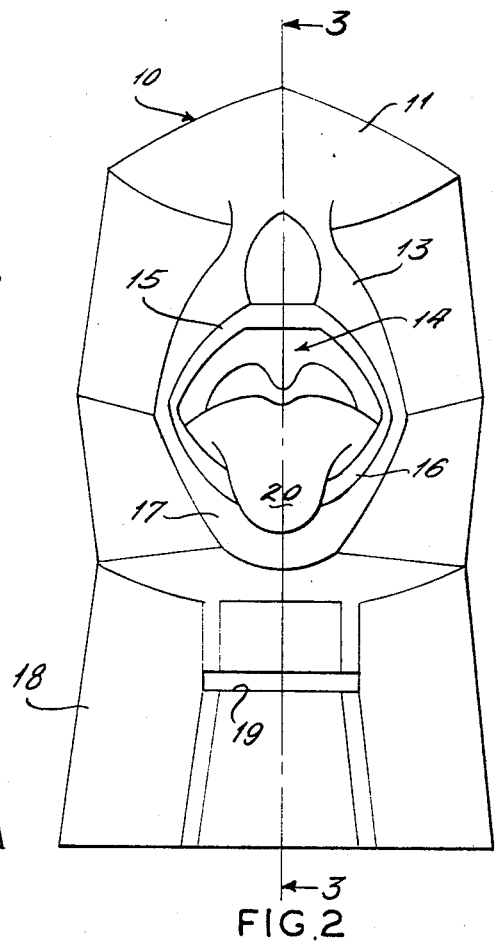
FIG.1  FIG.2
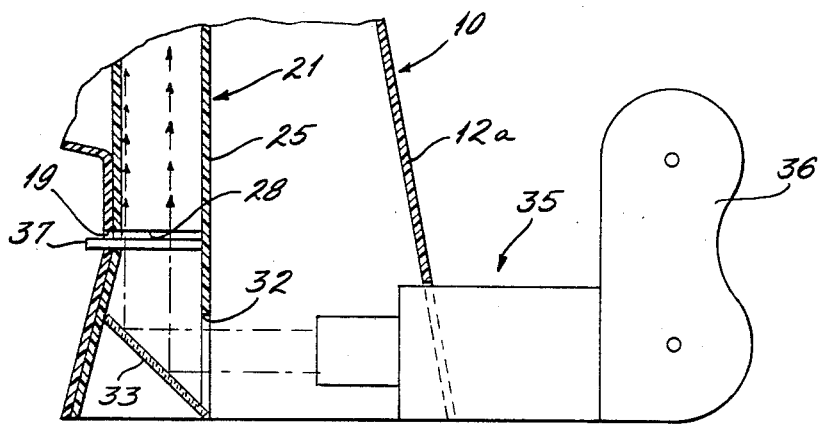
FIG.5

G. H. BRECKWOLDT 3,471,944

LARYNGOSCOPIC MANIKIN

Filed Nov. 21, 1967

INVENTOR:
GERHARD H. BRECKWOLDT

BY Gravely, Lieder & Woodruff

ATTORNEYS.

United States Patent Office 3,471,944
Patented Oct. 14, 1969

3,471,944
LARYNGOSCOPIC MANIKIN
Gehard H. Breckwoldt, University City, Mo., assignor to St. Louis University, St. Louis, Mo., a not-for-profit corporation of Missouri
Filed Nov. 21, 1967, Ser. No. 684,723
Int. Cl. G09b 23/28
U.S. Cl. 35—17                                    8 Claims

ABSTRACT OF THE DISCLOSURE

A laryngoscopic manikin proportioned and constructed in accordance with average dimensions of the oral cavity and laryngopharynx of the human body so as to provide an actual size teaching aid and demonstration model in the study of laryngology, phoniatrics and general laryngeal and voice hygiene.

---

This invention relates to improvements in teaching aids such as manikins which present portions of the human body in life size reproduction, and is particularly directed to a manikin of oral cavity and laryngopharynx portions of the human body for aiding in the teaching of medical, phoniatric and voice hygiene practices.

Heretofore teaching aids used in connection with the scientific study of the human body have generally been inaccurate relative to average body dimensions and appearance so that a student or observer of the manikin is given a false concept of the size and appearance of whatever body portion the manikin is intended to represent. Manikins heretofore available have also generally been constructed with a view to displaying a large number of items and in one area of concentration. The former, old approach leads to distraction, confusion and uninteresting demonstration. On the other hand, the new approach of the present invention heightens concentration, enthusiasm and mnemonic power. These and other objections and abnormal practices in connection with the manufacture of manikins are intended to be overcome and improved upon by the manikin of the subject invention.

It is an important object of the present invention to provide a manikin having a specialized area for display which is as nearly lifelike as is possible, so as to reveal in a realistic manner the phonatory mechanism of the human body for the purpose of the study and demonstration of normal and abnormal variety of pathologies.

It is a further important object of the present invention to provide a manikin made of suitable materials, such as plastic, so as to simulate or reproduce as nearly as possible the appearance and responses of portions of the human body where the area of concentration is concerned.

Still another object of the present invention is to provide an improved manikin of lifesize and flawless average proportions and appearance so as to form an accurate basis for the teaching of laryngoscopic techniques, and to particularly provide such a manikin that reproduces the larynx area of the human body and the area of approach thereto including the tongue, velum and uvula.

A further object of the present invention is to provide an improved laryngoscopic manikin with substantially lifelike components leading into the larynx area and to make provision for displaying photographs of the vocal folds, and, with suitable attachments, to display cinematographic films, whereby to promote by color slides and/or films and sound means, normal and abnormal phonatory phenomena.

Figure 3:
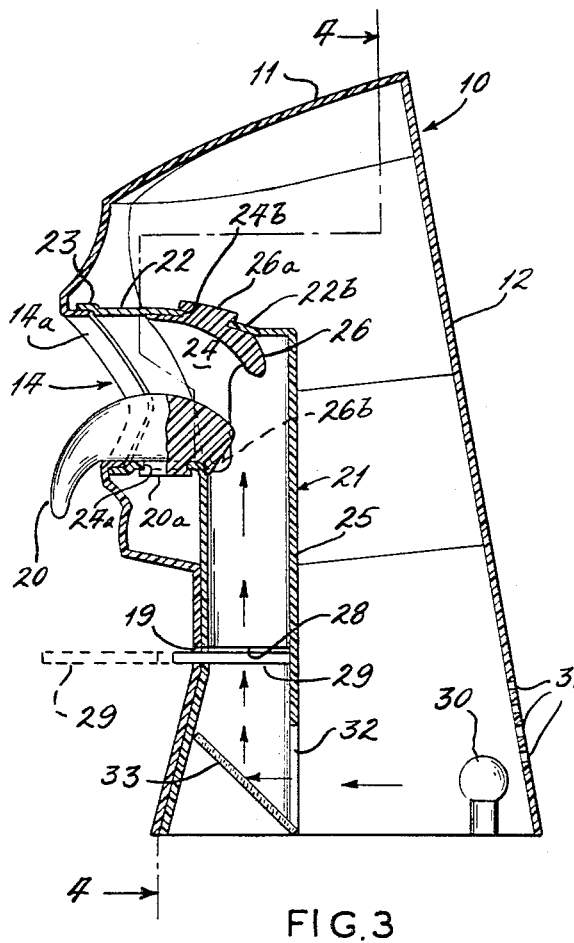
Figure 4:
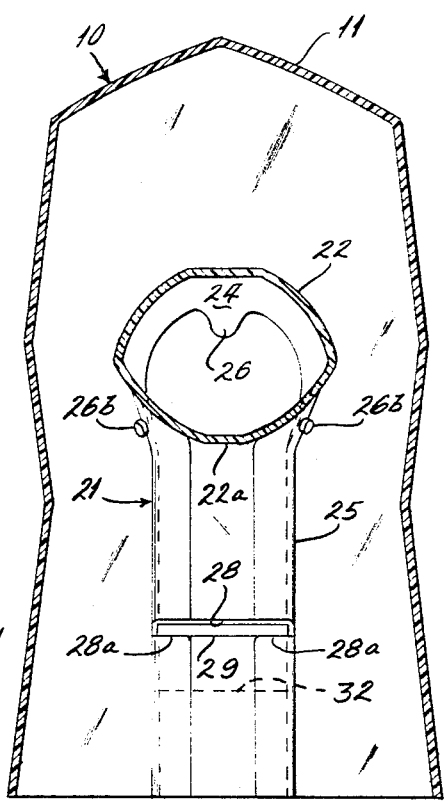

Other objects of this invention will be set forth in the following specification which deals with a preferred construction of manikins for the purpose of disclosing the principles and advantages of the present improvement, and reference will be directed to the several views in the accompanying drawings wherein:

FIG. 1 is a side elevational view of the manikin forming the basis for the present invention;
FIG. 2 is a front elevational view of the said manikin;
FIG. 3 is a sectional elevational view taken at line 3—3 in FIG. 2;
FIG. 4 is a sectional elevational view of the present manikin, the view being taken along line 4—4 in FIG. 3; and
FIG. 5 is a fragmentary sectional view showing a modification of the present invention to accommodate the display of motion pictures.

Reference will now be directed to FIGS. 1 and 2 where it is observed that the manikin 10 is intended to simulate the streamlined and stylized head and neck of the human body, and in presenting this portion of the body structure there is a shell 11 having shaped front portions as will hereafter be described, and a rear panel 12 that is removable for the purpose of providing access to the interior. The shaped front portions of the manikin may be abbreviated as shown or they may provide a lifelike duplication of the facial surface 13 surrounding the mouth opening 14. In either case the desire is directed toward especially reproducing in lifelike size the upper lip 15 and lower lip 16. A simulated lifelike chin shape 17 is provided, and the chin merges rearwardly and downwardly into a neck portion 18 provided with a slot 19 for a purpose later to appear.

Since the present invention is primarily concerned with the oral cavity and laryngopharynx and oropharynx, it will be sufficient to point out that the manikin includes a tongue 20 made of soft plastic material so as to correspond to the appearance of the human tongue as well as to reproduce its lifelike feel.

Turning now to FIGS 3 and 4, attention will be directed to the details of the mouth, throat and neck areas which in the present manikin are formed separately from the shell 11. This portion consists of an inner structure 21 which has an upper angularly enlarged portion 22 facing toward the mouth 14 and suitably connected to the flange 14a thereof by a peripheral flange 23. The shape of the angular portion 22 is shown to advantage in FIG. 4 since it is intended to duplicate as likelife as possible, the oral cavity 24 of the human head. The vertically descending portion 25 of the inner structure 21 is intended to duplicate the throat of the human body and is therefore given a dimension that would be considered average in an adult body. The oral cavity 24 forms the entrance to the descending structure 25 of the inner structure. The lower surface of the oral cavity which is normally under the tongue is formed with an opening 24a to receive a projection 20a on the underside of the tongue 20 which snaps or is located in the opening 24a, and this properly locates the tongue and prevents its unintended displacement. In the human oral cavity there is a soft palate 26 part of which is the uvula; and in the present manikin this palate 26 is formed in one piece and suitably secured to the roof portion 22b of the oral cavity 24 so as to reproduce the human likeness thereof. Furthermore, the soft palate 26 has a main projection 26a that snaps or is located in an opening 24b in the roof 22b and side projections 26b that similarly locate the side portions of the soft palate in position. In order to provide the uvula, soft palate and tongue with likelike responses these portions of the manikin are made of soft plastic material.

One of the important features of the present manikin is the provision of the slot or opening 19 in the outer shell 11 and to continue the slot at 28 in the descending portion 25 of the inner structure 21. In this provision of the manikin the slot 19 and its registering slot 28 are disposed at a depth within the shell of the manikin 10 that accurately reproduces the location of the vocal folds. The slots 19 and 28 are so proportioned that opaque color prints or transparent still picture slides, such as is shown at 29, may be easily inserted and removed. The transparent slides 29 can be illuminated by means of a source of light 30 carried in the rear ventilated portion of the shell 11 so as to permit the escape of heat at apertures 31 in the back of panel 12. The light produced from the lamp 30 passes through an aperture 32 in the rear lower portion of the inner structure 21 so as to strike a reflector 33 and direct the light upward against the underside of the slide 29 when it is positioned within the slot 28. As shown in FIG. 4, the slot 28 in the inner structure 21 is formed with lateral marginal portions 28a for the purpose of supporting the margins of a slide 29, as well as for retaining the slide against unnecessary motion or chance of buckling because of heat from the light source 30.

All of the aforesaid disclosure is directed to suitable requirements for the viewing and studying of an illuminated transparency by means of a laryngoscopic mirror. In order to use the laryngoscopic manikin as an aid in teaching the technique of laryngoscopy the source of illumination 30 (FIG. 3) is not turned on but instead of the use of a transparent slide 29, a color print of identical dimensions is used. In this way a trainee must rely on the usual external illumination, such as a head reflector as is customarily employed by the ear-nose-throat specialist or phoniatrist. In this way the rudiments of laryngoscopic examination technique may be taught with safety, speed and most importantly, with thoroughness. Furthermore, after a student has become versed in laryngoscopic viewing, the teaching procedure can advance to the state of observing and studying laryngeal conditions by means of individual slides 29. Actual color conditions can be reproduced in this manner and are most effectively presented in a lifelike size cavity in the manikin. It is pointed out that an extensive library of diapositives can be accumulated in which a student will be able to see more pathologies than can be effectively presented in books or films; and teachers can use the manikin for academic examinations and practical tests, especially when no living patients are available. There are, of course, other uses to which the present improved manikin may be put, such as in connection with scientific and educational exhibits, and as a "live" accessory to medical books.

When the manikin as above described is to be utilized in connection with motion picture film, certain modifications are necessary, all as will be described in connection with FIG. 5. In the modified view of the drawing the light source 30 is removed and a different rear panel 12a is utilized so that a telescopic adapter unit 35 may be mounted in the lower portion of the manikin body 10 to project the image from the movie film unit 36 onto the mirror 33 where it is directed upwardly in the passage 25. The image projected upwardly in the passage 25 is displayed on a suitable transparent screen 37 which is now inserted in the slot 28 where, as before described, color prints or still picture transparencies could be mounted for display.

The foregoing description of preferred embodiments of the present invention has been limited to a manikin in which the body shell 10 is hollow. The body may be made in molded parts and then suitably cemented or secured together at final assembly. The same is true of the inner structure 21. It has also been disclosed that the tongue 20 can be separately formed and secured in position by a projection which is received in an opening formed in the lower surface of the oral cavity. Similiarly, the soft palate and uvula may be secured in position by projections thereon which are received in suitable openings in the inner structure 21.

It is, of course, fully apparent that instead of a shell body the manikin may be formed as a solid molding with integral oral cavity and throat passage. This type of manikin would be made in at least two parts that could be secured together after mounting the tongue and soft palate and uvula complements. In the case of a more or less solid molded manikin, the arrangement for illuminating transparent still pictures would not be altered, and the application of the motion film adapter 35 and film unit 36 would be relevant.

The foregoing specification has set forth a structure of a presently preferred manikin so as to provide a basis for the appended claims, and it is appreciated that changes and modifications may occur to those skilled in the art after understanding the foregoing specification, and it is pointed out that such changes and modifications are to be included, so far as possible, within the annexed claims.

What is claimed is:

1. A laryngoscopic manikin comprising a body having an oral cavity formed therein and opening outwardly of the body and a laryngopharyngeal passage communicating with said oral cavity and extending into said body, tongue means disposed in said oral cavity with a portion extending outwardly of said body, and a soft palate and uvula disposed in said oral cavity, said laryngopharyngeal passage having means inwardly of said oral cavity for a display of the larynx.

2. The manikin of claim 1 wherein said body is a hollow shell and a separate member forms said oral cavity and laryngopharyngeal passage.

3. The manikin of claim 1 wherein said tongue means has an element thereon connecting said tongue means to said body.

4. The manikin of claim 1 wherein said soft palate and uvula have means thereon connecting the latter to said body.

5. The manikin of claim 1 wherein said tongue means and palate and uvula are made of soft plastic material substantially to duplicate the human appearance and response of the same.

6. The manikin of claim 1 wherein said laryngopharyngeal passage larynx display means includes a first opening located a distance from said oral cavity substantially duplicating the average distance in a human being, said first opening having means to support pictures of the larynx.

7. The manikin of claim 6 wherein a second opening is located beyond said first opening, a reflector is disposed adjacent said second opening and a source of illumination is exposed to said reflector for reflection upwardly in said laryngopharyngeal passage to illuminate pictures of the larynx.

8. The manikin of claim 1 wherein a motion picture film projector is coupled to said body to throw its pictures into said laryngopharyngeal passage, and transparent screen means is disposed in said latter passage to intercept and display the projected pictures.

References Cited

UNITED STATES PATENTS

| 3,273,261 | 9/1966 | Lovercheck | 35—17 |
| 3,381,392 | 5/1968 | Markman | 35—17 |

FOREIGN PATENTS

| 116,707 | 3/1930 | Austria. |

EUGENE R. CAPOZIO, Primary Examiner

HARLAND S. SKOGQUIST, Assistant Examiner